United States Patent Office 2,926,174
Patented Feb. 23, 1960

2,926,174

CONDENSATION OF AROMATIC CARBOXYLIC ACIDS WITH CARBOHYDRATES AND RELATED MATERIALS

Carl B. Linn, Riverside, Ill., assignor, by mesne assignments, to Universal Oil Products Company, Des Plaines, Ill., a corporation of Delaware No Drawing. Application June 18, 1957
Serial No. 666,487

5 Claims. (Cl. 260—345.7)

This application is a continuation-in-part of my copending application Serial No. 401,068, filed December 29, 1953, now Patent No. 2,798,079.

This invention relates to a process for interacting aromatic carboxylic acids with carbohydrates and materials closely related to carbohydrates. The process relates more particularly to the condensation of simple sugars, their desoxy- and omega-carboxy derivatives, compound sugars or oligosaccharides, and polysaccharides, with aromatic carboxylic acids in the presence of a hydrogen fluoride catalyst.

An object of this invention is to produce organic materials suitable for use per se or as intermediates in the manufacture of detergents, pharmaceuticals, explosives, gelling agents, surface coatings, resins, and corrosion inhibitors by condensing aromatic carboxylic acids with carbohydrates or with carbohydrate derivatives.

One embodiment of this invention relates to a process which comprises condensing an aromatic carboxylic acid with a carbohydrate in the presence of a hydrogen fluoride catalyst to produce a compound selected from the group consisting of a carboxyaryl-desoxy-alditol and a carboxyaryl-desoxy-ketitol, and recovering said resultant condensation product.

A specific embodiment of this invention relates to a process which comprises condensing benzoic acid with glucose in the presence of a hydrogen fluoride catalyst to produce a 1-(carboxyphenyl)-1-desoxy-glucitol, and recovering said resultant condensation product.

I have found that useful water-insoluble condensation products and also water-soluble condensation products are formed by reacting aromatic carboxylic acids with carbohydrates and related substances in the presence of a hydrogen fluoride catalyst. These reactions may be carried out in steel equipment or other suitable apparatus lined with silver, copper, and certain alloys such as Monel metal and the like. This treatment may be effected at temperatures of from about −40° to about 100° C. and preferably at temperatures of from about −10° to about +50° C. The pressure at which the reaction is carried out will vary with the reaction temperature used and the mol fractions of reactants and hydrogen fluoride catalyst present. While many of the condensation reactions are carried out at substantially atmospheric pressure, it may be desirable in certain instances and with certain reactants to carry out the reaction at pressures up to about 100 atmospheres or more. It is convenient in most instances to operate the equipment utilized at the pressure generated by the reaction mixture and the catalyst contained therein.

Aromatic carboxylic acids which may be used as starting materials in the process of this invention include benzoic acid, ortho-toluic acid, meta-toluic acid, para-toluic acid, ortho-chlorobenzoic acid, meta-chlorobenzoic acid, para-chlorobenzoic acid, ortho-bromobenzoic acid, meta-bromobenzoic acid, para-bromobenzoic acid, ortho-nitrobenzoic acid, meta-nitrobenzoic acid, para-nitrobenzoic acid, 3,5-dinitrobenzoic acid, salicylic acid, meta-hydroxybenzoic acid, para-hydroxybenzoic acid, anisic acid, gallic acid, syringic acid, anthranilic acid, meta-aminobenzoic acid, para-aminobenzoic acid, etc. Utilizable polybasic aromatic carboxylic acids include phthalic acid, isophthalic acid, terephthalic acid, hemimellitic acid, trimellitic acid, trimesic acid, prehnitic acid, mellophanic acid, pyromellitic acid, diphenic acid, etc. In some instances homologs of the aromatic carboxylic acids may also be utilized as starting materials in the process of this invention, such compounds including phenyl acetic acid, hydrocinnamic acid, gamma-phenylbutyric acid, delta-phenyl-n-valeric acid, epsilon-phenyl-n-caproic acid, cinnamic acid, phenylpropiolic acid, homophthalic acid, ortho-phenylenediacetic acid, meta-phenylenediacetic acid, para-phenylenediacetic acid, ortho-phenylene-acetic-beta-propionic acid, etc.

Carbohydrates which are condensed with aromatic carboxylic acids to form a compound selected from the group consisting of a carboxyaryl-desoxy-alditol and a carboxyaryl-desoxy-ketitol include simple sugars, their desoxy-and omega-carboxy derivatives, compound sugars or oligo saccharides, and polysaccharides.

Simple sugars include dioses, trioses, tetroses, pentoses, hexoses, heptoses, octoses, nonoses, and decoses. Compound sugars include disaccharides, trisaccharides, and tetrasaccharides. Polysaccharides include polysaccharides composed of only one type of sugar residue, polysaccharides composed of more than one type of sugar unit, polysaccharides composed of one type of uronic acid unit, i.e., polyuronides, polysaccharides composed of aldose (pentose or hexose) and uronic acid units, polysaccharides containing hexose units esterified with an inorganic acid, and polysaccharides containing amino sugar units.

Utilizable simple sugars include the diose, glycolaldehyde; trioses, such as glycerylaldehyde and s-dihydroxyacetone; tetroses, such as erythrose, threose, erythrulose, and apiose; the pentoses, such as arabinose, xylose, ribose, lyxose, rhamnose (a methylpentose), fucose (a methylpentose), rhodeose (a methylpentose), digitalose (a methoxymethylpentose), ketoxylose (a ketopentose), 2-desoxy-ribose and 2-desoxy-methylpentose (digitoxose); hexoses, such as mannose, glucose, idose, gulose, galactose, talose, allose, fructose, sorbose, tagatose, and psicose; heptoses, such as glucoheptose, mannoheptose, galactoheptose, sedoheptose, mannoketoheptose, glucoheptulose and perseulose; octoses, such as glucooctose, mannooctose, and galactooctose; nonoses, such as glucononose, and mannononose; and decoses such as glucodecose. Desoxy derivatives of simple sugars are formed by the replacement of a hydroxyl substituent in a sugar with hydrogen thereby forming a methyl or methylene linkage. The desoxypentoses and desoxyhexoses are the most commonly occurring of such compounds. The omega-carboxy derivatives of simple sugars, which are suitable in the process of the present invention include tartronic semialdehyde or its tautomer, hydroxy pyruvic acid; alpha-gamma-dihydroxy-acetoacetic acid, threuronic acid, 4-keto-2,3,5-trihydroxy-pentanoic acid, xyluronic acid, 5-keto-tetrahydroxyhexanoic acids such as 5-keto-allonic acid, 5-keto-gluconic acid, 5-keto-mannonic acid, 5-keto-gulonic acid, and 5-keto-galactonic acid; uronic acids containing 6 carbon atoms such as glucuronic acid, mannuronic acid, and galacturonic acid, and the 6-keto-pentahydroxyheptanoic acids. The simple sugars and their omega-carboxy derivatives, as starting materials in the process of this invention, may be represented by the following general formula:

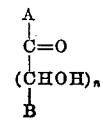

in which A equals H and $CH_2OH$, $n$ equals an integer from 1 to about 12 or so, and B equals H, $CH_2OH$, and COOH. As an example of the utility of this general formula, when A=H, $n=1$, and B=H, the compound is glycolaldehyde; when A=H, $n=1$, and B=$CH_2OH$, the compound is glycerylaldehyde; when A=H, $n=1$, and B=COOH, the compound is tartronic semi-aldehyde, a tautomer of hydroxypyruvic acid; when A=$CH_2OH$, $n=1$, and B=H, the compound is s-dihydroxyacetone; when A=$CH_2OH$, $n=1$, and B=$CH_2OH$, the compound is erythrulose; when A=$CH_2OH$, $n=1$, and B=COOH, the compound is alpha-gamma-dihydroxyacetoacetic acid; when A=H, $n=2$, and B=$CH_2OH$, the compound is erythrose or threose; when A=H, $n=2$, and B=COOH, the compound is threuronic acid; when A=$CH_2OH$, $n=2$, and B=$CH_2OH$, the compound is riboketose or xyloketose; when A=$CH_2OH$, $n=2$, and B=COOH, the compound is a 4-keto-2,3,5-trihydroxypentanoic acid; when A=H, $n=3$, and B=$CH_2OH$, the compound is ribose, arabinose, xylose, or lyxose; when A=H, $n=3$, and B=COOH, the compound is a 5 carbon atom uronic acid such as xyluronic acid; when A=$CH_2OH$, $n=3$, and B=$CH_2OH$, the compound is psicose, fructose, sorbose, or tagatose; when A=$CH_2OH$, $n=3$, and B=COOH, the compound is a 5-keto-tetrahydroxyhexanoic acid; when A=H, $n=4$, and B=$CH_2OH$, the compound is allose, altrose, glucose, mannose, gulose, idose, galactose, or talose; when A=H $n=4$, and B=COOH, the compound is a 6 carbon atom uronic acid such as glucuronic acid, mannuronic acid, and galacturonic acid; when A=$CH_2OH$, $n=4$, and B=$CH_2OH$, the compounds are heptoses; and when A=$CH_2OH$, $n=4$, and B=COOH, the compounds are 6-keto-pentahydroxyheptanoic acids.

The utilizable oligosaccharides or compound sugars include disaccharides such as the pentose-hexose disaccharides including glucoapiose, vicianose and primeverose; the methyl pentose-hexose and disaccharides including glycorhamnoside, and rutinose; and the dihexoses such as turanose, maltose, lactose, cellobiose, gentiobiose, melibiose, sucrose, and trehalose. Other compound sugars are represented by trisaccharides such as the methylpentose-hexose saccharides including rhaminose and robinose; and the trihexose saccharides including raffinose, melezitose, and gentianose. An example of a suitable tetrasaccharide is stachyose.

Various polysaccharides are also utilizable in the process of the present invention. These polysaccharides include pentosans such as araban, methylpentosans such as fucosan, and hexosans such as starch, cellulose, glycogan, inulin, mannan, galactan, lichenin, levan, dextran, and laminarin. Other polysaccharides which are composed of more than one type of sugar unit such as pentosans like araboxylan, and the hexosans like galactomannan may be used. Other utilizable polysaccharides are represented by those composed of uronic acid units and aldose units such as gum arabic, damson gum, gum tragacanth, linseed mucilage, and pectins, those composed of uronic acid units such as pectic acid and alginic acid, and those containing hexose units esterified with an inorganic acid such as certain sea weed polysaccharides like agar.

The hydrogen fluoride catalyst which is used in this process may be used in anhydrous form or diluted with water to make a hydrofluoric acid of the desired concentration. The hydrofluoric acid may also be further diluted with various inert diluents when it is desirable to operate the process of this invention with low hydrogen fluoride concentrations. Suitable inert diluents include the perfluoro derivatives of n-paraffinic hydrocarbons such as perfluoropropane, perfluoro-n-butane, perfluoro-n-pentane, perfluoro-n-hexane, etc. Other suitable diluents are well known to those skilled in the art, for example, cycloparaffins such as cyclopentane or cyclohexane may be utilized. In some instances, hydrofluoric acid of from about 85 to about 100% HF concentration is desirable, and in some other instances it is most desirable to use anhydrous hydrogen fluoride as the catalyst.

The process may be carried out by slowly adding a hydrogen fluoride catalyst to a stirred mixture of aromatic carboxylic acid and carbohydrate or related material being subjected to reaction while maintaining the reaction temperature at from about −40° to about 100° C. by suitable cooling and/or heating means. It is often desirable or advisable to commingle the reactants and catalyst at relatively low temperatures such as from about −80° C. to about −30° C. and then to permit the reaction mixture to warm gradually while the reactants and catalyst are stirred by suitable means such as a motor driven stirrer or other adequate mixing equipment. After the reaction has reached the desired degree of completion, the hydrogen fluoride catalyst is removed from the reaction mixture by distillation at atmospheric or lower pressures, or by passing an inert gas through the reaction mixture while maintaining it at a relatively low temperature. Also the entire reaction mixture and catalyst may be mixed with water or may be added to ice in order to quench the activity of the hydrogen fluoride catalyst and to permit separation of the organic reaction products and unreacted starting materials from the catalyst. The organic reaction products may also be separated from aqueous hydrogen fluoride by means of an organic solvent such as ether in which some of the organic material may be dissolved. Further means of isolating the reaction products are illustrated in the examples. Thus the product formed by reacting benzoic acid with glucose or cellulose in the presence of substantially anhydrous hydrogen fluoride at 30° C. separated into an ether-soluble and water-insoluble product and an ether-insoluble and water-soluble product.

The process of this invention broadly emphasizes the reaction of carbohydrates including simple sugars, their derivatives, compound sugars, and polysaccharides with aromatic carboxylic acids using as a catalyst hydrogen fluoride. The type of product obtained is markedly affected by the length of time that the reactants are in contact with the hydrogen fluoride catalyst as well as the temperature of the reaction. The reaction products of this process lead to materials having diversified uses. For example, some of the reaction products can be used per se as surface coating materials, for example, thermosetting resins which can be prepared simply by heating. Resins can also be made by heating the reaction products with formaldehyde, urea, phenol, aniline, etc., and combinations of the above enumerated compounds. Nitration of many of the reaction products will give explosives. These explosives will contain nitro groups attached to the aromatic rings as well as being nitric acid esters or nitroalcohol derivatives. Detergents can be prepared from many of the reaction products by reaction with long chain amines to yield amides. Some of the reaction products have structures similar to those which have been found useful as detergent aids and therefore they may accordingly find use in such fields. Various reaction products are effective for gelling paraffinic or aromatic hydrocarbons. The nature of this invention is illustrated further by the following examples, which however, should not be construed to limit unduly the generally broad scope of this invention.

*Example I*

This example illustrates the reaction of an aromatic carboxylic acid, namely, benzoic acid with a carbohydrate, namely, cellulose. Cellulose is a polysaccharide containing glucoside linkages and with all but one of the potential aldehyde groups of the glucose residues involved in these glucosides.

As an example of the manner of conducting these experiments, the following detailed description is given: In a one liter steel turbomixer autoclave is sealed 41 grams of cellulose and 78 grams of benzoic acid. With stirring, the autoclave is then cooled to −78° C. and about 220 grams of hydrogen fluoride is added. The temperature is allowed to rise to 0° C. and the reactants are then contacted at this temperature for 36 hours. Then, a stream of nitrogen is passed through the reactor at room temperature to remove most of the hydrogen fluoride. A substantial amount of hydrogen fluoride remains behind in the reaction mixture, although most of it can be removed by prolonging the nitrogen purge. The autoclave is opened and the product is found to be a heavy fuming brown syrup. This is then poured into a silver dish and depending upon the amount of hydrogen fluoride remaining therein weighs from about 130 to about 150 grams. After standing for several days in a hood-draft the product solidifies to a crystalline mass. This crystalline mass is then mascerated with large quantities of cold water to remove unreacted carbohydrate, if any. During the process, the cellulose is broken down into glucose residues which become soluble in cold water. The cold water insoluble portion of the product is treated with boiling water which after cooling and reduction in volume yields a chemical individual corresponding to 1,1-di-(carboxyphenyl)-1-desoxy-glucitol of the following formula:

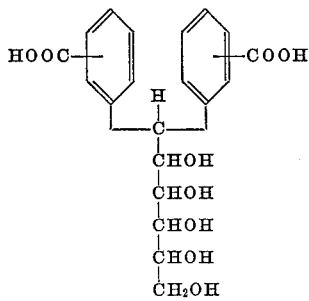

This product may be recrystallized from a 50% ethanol solution.

*Example II*

This experiment again illustrates the reaction of a carbohydrate, namely glucose, with an aromatic carboxylic acid. In this example 40 grams of glucose, 78 grams of benzoic acid, and about 225 grams of hydrogen fluoride are utilized. The procedure utilized in this example is the same as that described hereinbefore in Example I down through allowing the product to stand in a draft. To this crude product is added one liter of ethyl ether and the mixture is allowed to stand for two days. The ether is then decanted off and the residue is dissolved in 500 ml. of hot 50% ethanol. This alcohol solution is filtered while hot, and is then allowed to stand at 0° C. The crystals which separate at this point are identified and correspond to the 1,1-di-(carboxyphenyl)-1-desoxyglucitol described in Example I.

The more soluble part of the product is believed to contain a mono-carboxyphenyl-desoxy-glucitol corresponding to the following structural formula:

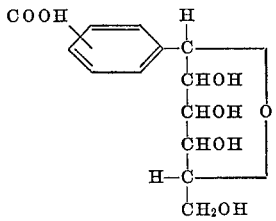

*Example III*

In this example, glucose is reacted with ortho-toluic acid. The experiment is carried out in a steel turbomixer autoclave as described in Example I, the charge being 87 grams of ortho-toluic acid, 40 grams of glucose, and about 225 grams of hydrogen fluoride. The ortho-toluic acid and glucose are sealed into the autoclave which is then cooled to about −30° C. at which temperature hydrogen fluoride is added. The temperature of the autoclave is then allowed to rise to room temperature and is kept there for 12 hours during which time the mixture is stirred. Then, while continuing the stirring, a stream of nitrogen is passed through the autoclave for about 3 hours. The reaction product is washed with several portions of water and the cold water insoluble portion thereof is dissolved in boiling water. This hot solution is filtered and set aside to cool. After standing for about 24 hours at 0° C., crystals of a chemical individual are recovered therefrom. This material after recrystallization is found to have the following structural formula:

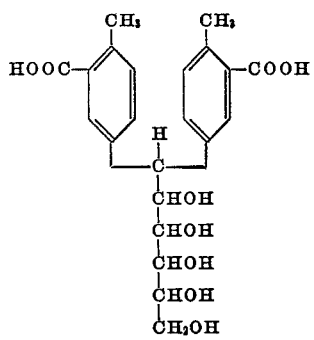

*Example IV*

In this example, starch is reacted with alpha-naphthoic acid. This experiment is carried out in a steel turbomixer autoclave as described in Example I, the charge being 110 grams of alpha-naphthoic acid, 40 grams of starch, and about 220 grams of hydrogen fluoride. The alpha-naphthoic acid and starch are sealed into the autoclave which is then cooled to about −40° C. at which temperature the hydrogen fluoride is added. The temperature of the autoclave is then allowed to rise to room temperature and is kept there for 24 hours during which time the reaction mixture is stirred continually. Then, a stream of nitrogen is passed through the autoclave for about 6 hours. The reaction product is washed with several portions of water, and the cold water insoluble portion thereof is dissolved in boiling water. This hot solution is filtered, cooled, and set aside at 0° C. From this cold filtrate a new chemical entity is recovered. After recrystallization from 50% ethanol a product is isolated of the following structure:

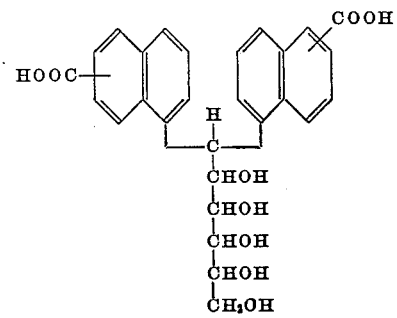

I claim as my invention:
1. A process which comprises reacting an aromatic carboxylic acid selected from the group consisting of aromatic hydrocarbon carboxylic acids and halo, nitro, hydroxy, amino and methoxy substituted aromatic hydrocarbon carboxylic acids with a carbohydrate selected from the group consisting of monosaccharides, oligosaccharides, and polysaccharides, in the presence of hydrogen fluoride catalyst at a temperature of from about −40° C. to about 100° C.

2. A process which comprises reacting benzoic acid with cellulose in the presence of hydrogen fluoride catalyst at a temperature of from about −40° C. to about 100° C.

3. A process which comprises reacting benzoic acid with glucose in the presence of hydrogen fluoride catalyst at a temperature of from about −40° C. to about 100° C.

4. A process which comprises reacting orthotoluic acid with glucose in the presence of hydrogen fluoride catalyst at a temperature of from about −40° C. to about 100° C.

5. A process which comprises reacting alphanaphthoic acid with starch in the presence of hydrogen fluoride catalyst at a temperature of from about −40° C. to about 100° C.

References Cited in the file of this patent
UNITED STATES PATENTS

| | | |
|---|---|---|
| 2,252,725 | Niederl | Aug. 19, 1941 |
| 2,798,079 | Linn | July 2, 1957 |

OTHER REFERENCES

Hackh's Chemical Dictionary, p. 260, 3rd ed., The Blakiston Co., Philadelphia (1944).